Sept. 3, 1929.   C. B. HOKANSON   1,726,563
ROAD FINDER
Filed Jan. 9, 1929
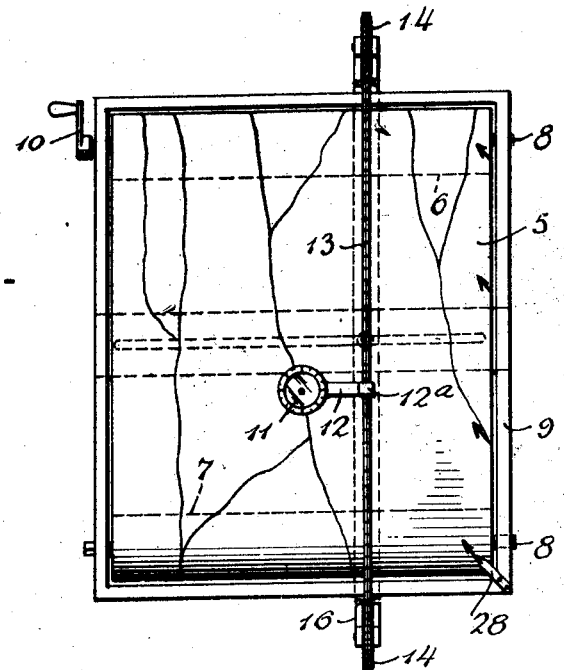
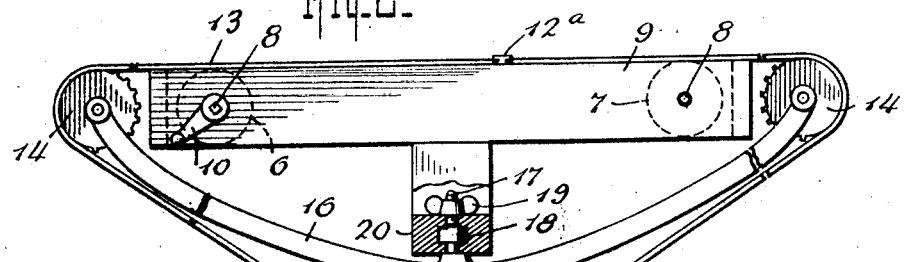
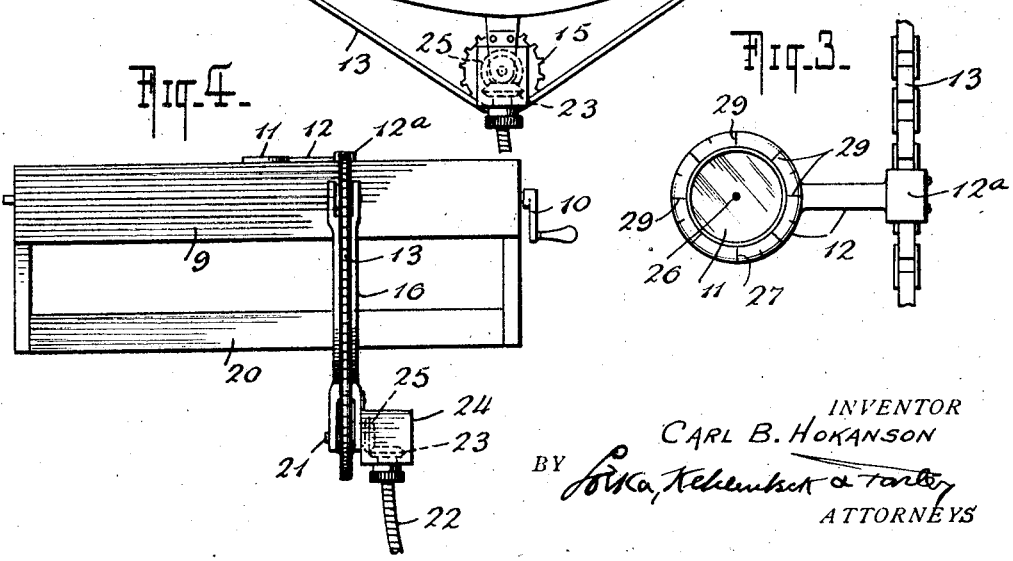
INVENTOR
CARL B. HOKANSON
BY
ATTORNEYS Patented Sept. 3, 1929.

1,726,563

UNITED STATES PATENT OFFICE.

CARL B. HOKANSON, OF NEW YORK, N. Y.

ROAD FINDER.

Application filed January 9, 1929. Serial No. 331,327.

My invention relates to road finders and has for its object to provide a simple and efficient apparatus, adapted particularly for use in the operation of automobiles, whereby the proper direction of travel at points of doubt such as road intersections and road forks may be accurately determined in a simple manner. Other more specific objects will appear from the description hereinafter and the features of novelty will be pointed out in the claims.

In the accompanying drawing, which illustrates an example of the invention without defining its limits, Fig. 1 is a diagrammatic front elevation of the road finder; Fig. 2 is a diagrammatic side elevation thereof; Fig. 3 is an enlarged detail view of an indicator forming part of the device, and Fig. 4 is a detail view illustrating an example of gearing used in the device.

In the form illustrated in the drawing, the road finder comprises a road map 5, which includes reproductions of roads of travel and in the preferred form consists of a web of suitable material carried by rolls 6 and 7. The latter are mounted upon suitable shafts 8 journaled in a main frame 9, any conventional means being provided whereby one or both of said rolls 6 and 7 may be manually rotated; in the illustrated example, this means comprises a crank 10 fixed upon the shaft 8 of the roll 6. With the arrangements set forth, successive portions of the map 5 may be brought into position in the frame 9 so as to be visible to the operator of the automobile or other vehicle with which the road finder is combined. The latter further includes an indicator which co-operates with the road map, or more specifically, with the reproduction of roads of travel which appear thereon, either the road map or the indicator being movable at a speed proportionate to the speed of travel of the automobile or other vehicle. In any case, the arrangement is such that a relative movement will be produced, which causes the indicator to traverse the road reproductions on the map, or the latter to move relatively to the indicator, the result in each case being the same. In the illustrated example, the indicator comprises an indicating disk 11, preferably made of some transparent material such as celluloid, forming part of a carrier 12, which is secured to an endless sprocket chain 13, arranged to move the indicating disk 11 in close proximity to and over the face of the map 5; the connection between the carrier 12 and the chain 13 is such that the carrier 12 is capable of being adjusted to different positions on said chain to correspondingly adjust the position of the indicating disk 11 relatively to the map 5, and the illustrated example accordingly shows a suitable clamp 12ª for this purpose. The chain 13 travels over sprocket wheels 14 and 15, journaled upon an auxiliary frame 16, as shown in Fig. 2. At a point in registry with the transverse horizontal center line of the main frame 9, the auxiliary frame 16 is provided with a pivot pin 17, pivotally mounted in a block 18 and having its free end threaded to receive a wing nut 19 whereby pivotal movement of the auxiliary frame 16 is prevented. The block 18 is slidably mounted in or upon a guide rail 20, which extends transversely across the frame 9 and is fixed thereon or forms an integral part thereof in any conventional manner. The sprocket chain 13 is operatively connected with a suitable driving medium forming part of the operating mechanism of the vehicle and arranged to produce the desired proportionate speed of travel in the chain 13, said connection, for instance leading to the speedometer mechanism of an automobile. To enable the auxiliary frame 16 and its associated elements to be pivotally and slidably adjusted relatively to the main frame 9, without interference with the operation of the chain 13 and indicating disk 11, the sprocket wheel 15 may be carried by a shaft 21 journalled in a forked end of the auxiliary frame 16 and which is in suitable driving connection with the aforesaid speedometer mechanism or its equivalent. In the illustrated example the driving connection is effected by means of a flexible shaft 22 carrying a bevel gear 23 rotatably mounted in a casing 24 fixed upon the auxiliary frame 16. The bevel gear 23 meshes with a companion bevel gear 25 carried by the shaft 21. The flexible shaft 22 is long enough to permit the sprocket wheel 15 to travel with the auxiliary frame 16 throughout its range of transverse movement relatively to the main frame 9. With the arrangement set forth it will be obvious, as the block 18 with the pivot pin 17 is shifted lengthwise of the rail 20 to adjust the auxiliary frame 16 transversely to the main frame 9, that the casing 24 and bevel gears 23 and 25 will be correspondingly moved and that the flexible shaft 22 will accommodate itself to any adjustments of the aforesaid elements, so that the sprocket wheel 15 will remain in driving connection with the speedometer mechanism or its equivalent in all positions of the auxiliary frame 16. The latter is furthermore capable of pivotal adjustment on the pivot pin 17 without interfering with or breaking the aforesaid driving connection between the sprocket wheel 15 and its source of operation. Consequently the sprocket chain 13 and indicating disk 11 remain at all times in driving connection with the speedometer mechanism of the automobile or equivalent operating means in all adjustments of the auxiliary frame 16 relatively to the main frame 9. In addition to the parts so far described, the indicating disk 11 includes an indicating point 26 and a direction indicating device or north point designation 27 adapted to be brought into alignment with a co-operating indicating device pointing north and located at a suitable point on the road finder, the illustrated example showing this latter device in the form of an arrow 28 produced on the map 5 at suitable intervals and in any case pointing due north with respect to said map. Additional direction indicating devices 29 relating to directions other than north may be provided upon the disk 11 in correct directional relation to the north point designation 27, to facilitate the reading of the device.

In describing the operation of the road finder, the form thereof which is illustrated in the drawing will be utilized as a basis for the description, it being understood that equivalent arrangements whereby corresponding results are obtained, are assumed to be included in the descriptive matter. In practice the device is located upon the automobile or other vehicle at any convenient point within easy view of the operator or some other person in the vehicle, and preferably also within easy reach of such person. In operation the crank 10 is manipulated to bring that portion of the map 5 showing the section of the country over which the vehicle is travelling at the time, into view in the main frame 9, after which the device is set in a manner to bring the indicating point 26 of the indicating disk 11 into registry with the reproduction of the road on the map which corresponds to the road over which the automobile or other vehicle is passing. This is easily accomplished by slidably shifting the auxiliary frame 16 on the rail 20 relatively to the main frame 9. As the automobile or other vehicle travels over the road in question, the chain 13 will be operated at a proportionate rate of speed and the indicating disk 11 will accordingly be carried along and caused to pass over the exposed surface of the map 5 in approximate registry with or in the general direction of the reproduction of said road thereon. If the automobile or its equivalent arrives, for instance, at a fork in the road and the driver is doubtful as to which branch of the fork is the correct one to be followed, the auxiliary frame 16 is pivotally swung, after the wing nut 19 has been loosened, to a position to bring the direction indicating device or north point 27 of the indicating disk 11 into alignment with the co-operating direction indicating device or north point arrow 28, it being understood that the indicating point 26 is located above and in registry with the particular fork in question. The above operation will accordingly bring the chain 13 into approximate parallelism with the one branch of the fork, and as the driver of the automobile or other vehicle is assumed to have knowledge of the general direction in which he must travel to reach the desired destination, he may, by comparing the two forks with the north point 27 of the indicating disk 11 and with the other direction indicating devices 29 with which said disk may be provided, positively determine which of the two branches of the fork is the one which should be taken. The same operation is followed if a road intersection is reached and the operator of the vehicle is in doubt as to which direction is the proper one for him to take. In other words, when the auxiliary frame 16 is adjusted at any doubtful point in the route of travel, the approximate directions in which the various roads at the doubtful point extend may be readily determined by first bringing the indicating point 26 into registry with the fork or cross-roads which are in doubt and then adjusting the north point 27 into alignment with the arrow 28 or its equivalent and then noting the directions in which the doubtful roads extend with reference to the north. The determination of this question is facilitated by providing the disk 11 with the additional designations 29, indicating directions other than that to the north. When, by the operation of the chain 13 the indicating disk 11 reaches the upper end of the exposed section of the map 5, the latter is actuated by means of the crank 10 to expose a new section of said map and the indicating disk 11 is reset to its lowest position on the latter by manipulating the clamp 12$^a$. The operations above set forth are then repeated.

The road finder is very simple in its construction and operation, and enables the driver of the vehicle to accurately determine the proper direction of travel at doubtful points and virtually provides him with a compass operating in conjunction with a road map to positively furnish the information desired.

Various changes in the specific forms shown and described may be made within the scope of the claims without departing from the spirit of the invention.

I claim:—

1. A road finder for vehicles, comprising a road map, an indicator co-operating with said map, one of said elements being movable relatively to the other at a speed proportionate to that of the vehicle, and co-operating direction indicating devices, one of which is on said indicator, adapted to be brought into alignment at doubtful points of travel to indicate the correct route of travel.

2. A road finder for automobiles, comprising a road map including reproductions of roads of travel, an indicator adjustable into registry with said road reproductions on said map, one of said elements being movable relatively to the other at a speed proportionate to that of the automobile, and co-operating direction indicating devices, one of which is on said indicator, adapted to be brought into alignment with each other at a point of connection of two roads to indicate the proper road to be taken.

3. A road finder for automobiles, comprising a road map, an indicator co-operating therewith, one of said elements being movable relatively to the other at a speed proportionate to that of the automobile, a pair of co-operating direction indicating devices, one of which is on said indicator, a main frame carrying said map, and an auxiliary frame carrying said indicator, one of said frames being movable relatively to the other at doubtful points of travel to bring said direction indicating devices into alignment with each other to thereby indicate the correct route of travel.

4. A road finder for automobiles, comprising a main frame, a pair of rolls journaled on said main frame, a web of material extending between said rolls and carried thereby to constitute a road map, an endless member arranged to be driven over the face of said map at a speed proportionate to that of the automobile, an indicator movable with said member over said face of the map, co-operating direction indicating devices on said map and indicator, and an auxiliary frame carrying said endless member and pivotally movable relatively to said main frame to bring said direction indicating devices into alignment to indicate the correct route of travel.

5. A road finder for automobiles, comprising a main frame, a pair of rolls journaled on said main frame, a web of material extending between said rolls and carried thereby to constitute a road map, an endless member arranged to be driven over the face of said map at a speed proportionate to that of the automobile, an indicator movable with said member over said face of the map, co-operating direction indicating devices on said map and indicator, and an auxiliary frame carrying said endless member and pivotally movable relatively to said main frame to bring said direction indicating devices into alignment to indicate the correct route of travel, said auxiliary frame being transversely movable relatively to said main frame for adjusting said indicator relatively to the map.

In testimony whereof I have hereunto set my hand.

CARL B. HOKANSON.